July 29, 1924.
L. F. CLARK
1,503,229
PROCESS OF TREATING SOLUTIONS OF METALS
Filed July 2 1921
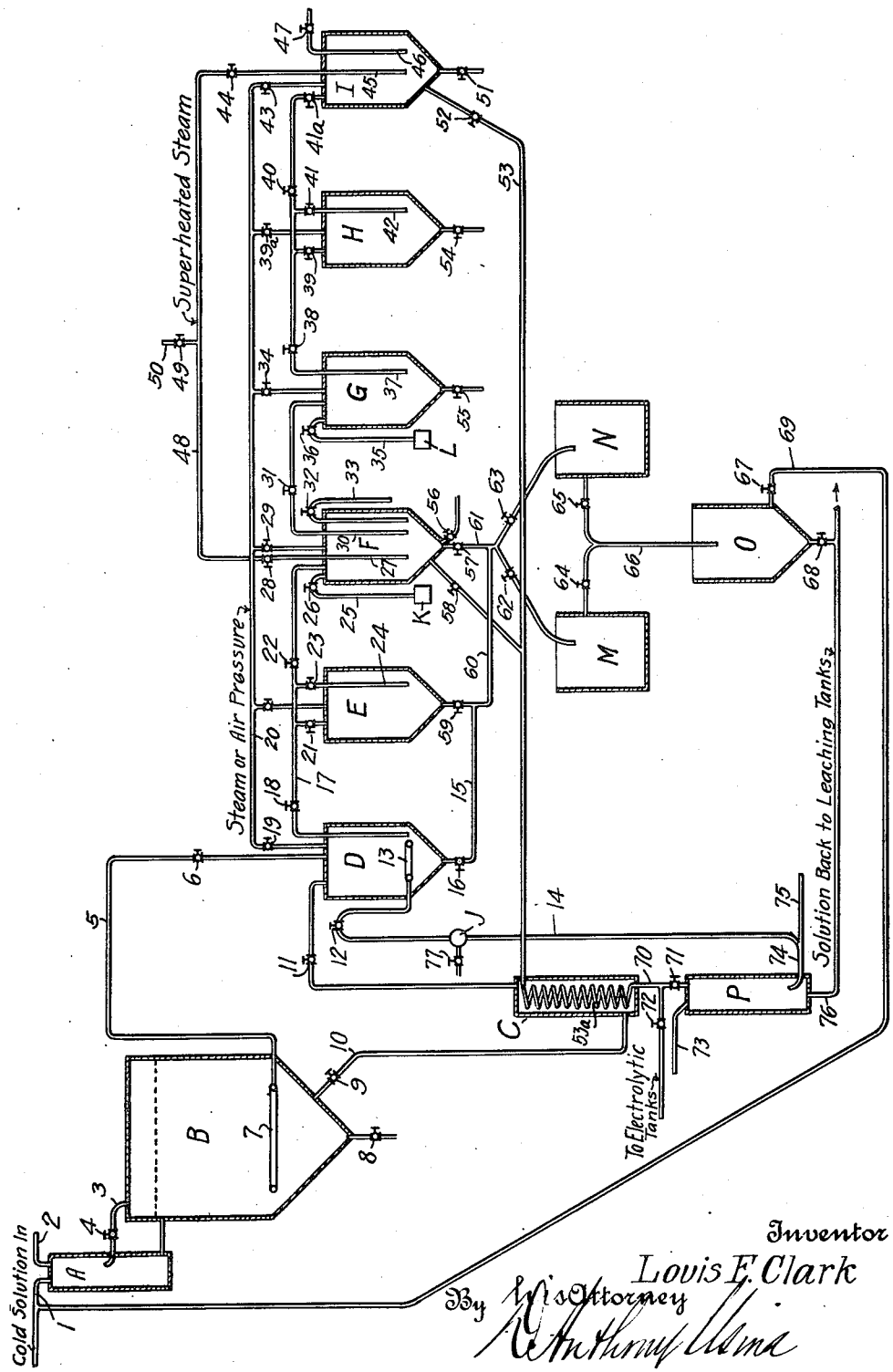
Inventor
Louis F. Clark
By his Attorney

Patented July 29, 1924.

UNITED STATES PATENT OFFICE.

LOUIS F. CLARK, OF POTRERILLOS, CHILE.

PROCESS OF TREATING SOLUTIONS OF METALS.

Application filed July 2, 1921. Serial No. 482,018.

*To all whom it may concern:*

Be it known that I, LOUIS F. CLARK, a citizen of the United States, and resident of Potrerillos, Chile, have invented certain new and useful Improvements in Processes of Treating Solutions of Metals, of which the following is a specification.

The extraction of copper and other metals by wet methods generally comprises two distinct processes, first the forming of a solution of the copper, and second the removal of the copper from the solution by precipitation. The present invention has to do with the treatment of the solution and relates to certain new discoveries by which the removal of the metal is facilitated and by which also certain other products may be secured from the solution. I have discovered certain conditions whereby metals may be collectively or successively removed from solution by precipitation and my invention may be applied in a variety of ways to utilize this discovery. Solutions of certain metals or of compounds of such metals can be subjected to such critical temperatures and pressures as to force the arrangement or formation of new molecular structures which are insoluble in the mother liquor under the conditions imposed, and which are therefore precipitated. By this method the metal or metals originally in solution can be to a substantial extent removed therefrom. In the fullest application of my invention precipitation is first brought about by such increase in temperature and pressure as to eliminate certain impurities or by-products from the solution, and in a second operation on the purified solution precipitation is brought about primarily by an added reagent.

For example, solutions of copper oxide ore in a solvent containing sulphuric acid generally contain metallic impurities, chiefly iron, arsenic and alumina, and also alkalies and phosphorus, which are detrimental to the extraction of the copper; and I have found that by certain temperatures and pressures I can cause the precipitation of these impurities to a greater or less extent, facilitating the extraction of copper. In referring to sulphuric acid solutions or sulphate solutions in connection with this invention I mean solutions which are mainly sulphuric acid solutions, though other acids may be present and may not only not interfere with the operation of the process but may be actually beneficial thereto. Thus we may have hydrochloric acid, nitric acid and sulphuric acid together in a solution and, under these complex conditions, it is difficult to say whether a metal, iron for example, exists in the solution as ferric sulphate or as ferric chloride. This precipitation process also tends to re-establish equilibrium in the solution by regenerating the acid, so that a cyclic process can be conducted without accumulation of detrimental impurities which, in previous processes, has necessitated a continuous discard of a considerable portion of the liquor.

I have found that the proportion of iron which is removed at a given temperature is a percentage of the total iron existing in the solution in the ferric state. To secure the best results, therefore, I prefer to oxidize the solution before practicing the precipitation process, the oxidation serving to increase the percentage of iron which is in the ferric state.

From the economic point of view, since the problem is essentially one in heat conservation, it is advantageous also to transfer heat from the residual liquor after the purifying operation, to the advancing solution which is to be used for the next purifying operation.

In the above described operation, especially iron and aluminum seem to be precipitated as salts of the metals, for example, as basic sulphates from a sulphate solution containing surprisingly large quantities of free sulphuric acid, quantities which under normal conditions of temperature and pressure preclude the formation of basic salts.

After the precipitation brought about by increased temperature and pressure, a second precipitation is brought about primarily by an added reagent of a reducing nature. This produces a precipitate, not of a salt, but of the metal (copper for example). This second precipitation is greatly facilitated by the first, for reasons hereinafter stated at length, and the two steps taken together form a complete process of great value.

When substances are treated with a solvent, the process of solution is essentially one of oxidation of the metal and reduction of the solvent. On the other hand the precipitation of the metallic base from its solution is effected by a reduction thereof and an oxidation of the liquor. Ferric sulphate is a beneficial constituent of a leaching solution because of its oxidizing action, but it is a detrimental constituent in any subsequent effort to recover the dissolved copper. An important and attractive feature of my process is that it permits and encourages the use of ferric sulphate as an oxidizing agent in the leaching process to increase the recovery of copper, and then permits the removal of the major portion of the ferric sulphate by precipitation before the solution is treated to remove the copper. These considerations, coupled with the utility to maintain clean and effective solutions in the cyclic process without material discard make the process extremely advantageous.

The accompanying drawing and description apply particularly to the extraction of copper from sulphate solutions and the use of sulphur dioxide and the like for extracting copper after the purifying operation. The process is applicable also to solutions of other metals, and to other than sulphate solutions, and the purification may be applied to the solution either before extraction of copper or other metal desired or at any other stage in the treatment before the return of the liquor to the starting point.

Referring to the drawing, which it will be understood, is chiefly diagrammatic, the process will be understood best by following a portion of the solution through its various phases of treatment; the tank A holds a comparatively small quantity of cold solution, which runs therefrom into a tank B where it is treated, thence through a heat interchanging tank C and a supplementary heating tank D, thence it passes in various ways, hereinafter described, into the tanks E, F, G, H and I. The tank F is the one in which the iron and other impurities are precipitated. An ozonizer is indicated at J as part of the oxidation cycle A, B, J, D. Small receivers or tanks K and L are arranged to temporarily hold an excess of the sulphur dioxide from the tanks F and G. Settling tanks M and N receive the precipitate from the tank F, and the supernatant liquids in the tanks M and N pass off into a storage tank O. A short tower P receives the discharged solution from the heat interchanger C and serves for the treatment thereof before it has passed back to the leaching tanks.

Assuming the system in operation and the several tanks B, D, E, F, G, H and I full and at their proper temperatures and pressures, the iron precipitator tank F stands at about 100 pounds gage pressure and 170 degrees centigrade. This condition has been produced by the injection of super-heated steam through the line 50, 48, 27 controlled by the valves 49 and 28. This pressure and temperature will cause precipitation of the iron and other impurities, which are allowed to settle. After the settling period the precipitated sludge is blown out of the tank F through the valve 57, the valve 56 being closed, the blowing out being produced by air pressure through the valve 29 and piping leading to the top of the tank. The precipitate and the accompanying part of the solution, which should be as small in volume as possible, is carried through the pipe 61 and discharged through either of the branches and valves 62 and 63 into one or the other of the settling tanks M and N. Subsequently as the supernatant liquid in M and N rises above the level of the exit pipes shown, it is drawn off through the valves 64 and 65 and through the pipe 66 into a storage tank O, from which it may be sent back into the system by opening the valve 67 or 68, the former being in the pipe 69, which is in communication with the pipe 1 through which the solution enters the system. Or the liquid from O may be passed through the valve 68 into the pipe 76 which returns it directly to the leaching tanks.

A sufficient portion of the precipitate having been removed from the tank F, the latter may then be used as a precipitator for metallic copper. The pressure and temperature in the tank may be reduced somewhat by opening the valves 22 and 23 and blowing back into the tank E through the pipe 24. This conserves heat by increasing the temperature of the advancing solution which stands in the tank E. When the pressure has been sufficiently lowered in the tank F reducing reagents are injected into it from a container (not shown) through the valve 32 and pipe 33, forcing it in by means of a pressure higher than that in the tank F. For example, the reagent may be sulphur dioxide, $SO_2$, or formic acid $H_2CO_2$. The temperature in the tank F may again be increased, if necessary, by injection of superheated steam through the pipe 27 as before until the precipitation temperature (155 degrees or 165 degrees centigrade) of the reagent is reached. When a sufficient portion of the copper has been precipitated it is blown off through the valve 56, the valve 57 being closed.

In case sulphur dioxide has been used, the excess must be recovered. This may be done through the pipe 25 by opening the valve 26, which causes the solution to boil so that the excess is expelled into the receiver K, from which it can be returned to tank F when needed by use of a suitable compressor. It is important that this excess of sulphur dioxide be removed from the tank F so as to prevent its entering the tanks E and D in the subsequent equalization steps. The advancing solution in the tanks E and D is under oxidizing conditions preparatory to the precipitation of iron, so that sulphur dioxide must not be injected into it. In case formic acid has been used in the tank F to precipitate the copper, the decomposition product is carbon dioxide, which is not opposed to an oxidation process. It would do no harm, therefore, to the advancing solution in D and E and will not be boiled off into the receiver K before the equalizing step unless it be desired to recover the carbon dioxide at once.

The above steps describe the use of the tank F first as an iron precipitator and then as a copper precipitator. The basic sulphates (of iron and other impurities) are precipitated in the tank F from an oxidized solution. When once formed they seem to be very insoluble in the mother liquor. They are, however extremely soluble in a reducing solution such as those described for the precipitation of the copper. If there is difficulty in entirely removing the iron precipitates by blowing off the sludge or if a large portion of the iron precipitates is retained by adhering to the walls of the precipitator, and this precipitator is then used for the precipitation of copper, the heat energy which was used to produce that residual iron precipitate will have been wasted. Also the reagents used to precipitate the copper will not be so effective because of the presence of greater amounts of ferric iron. It may be desirable, therefore, to use the tank F for iron only and to transfer the purified solution to a subsequent tank or system of tanks for the removal of the copper. Such a process will now be described.

Assuming now that the desired amount of salts of iron and other impurities has been removed from the solution in the tank F, the pressure being again at about 100 pounds and the temperature 170 degrees centigrade, the valves 22 and 23 leading to the pipe 24 are opened. The tank E has been standing at about 35 pounds pressure and 138 degrees centigrade. The opening of communication with the tank F brings about an approximate equalization in the two tanks, say a pressure of 65 pounds and a temperature of 155 degrees centigrade. The valve 23 is then closed and communication is opened through the pipe 17 and valve 18 between the tanks F and D. The tank D has been standing at about atmospheric pressure and just below the boiling point. It is approximately equalized with the tank F, at a pressure and temperature of about 30 pounds and 135 degrees centigrade.

If now, it is not desired to precipitate copper by a pressure process, such as has been described above in the tank F, the solution in F at about 30 pounds pressure and 135 degrees centigrade is discharged through the valve 58 into the pipe 53 and thence through the coil 53$^a$ in the heat interchanger C, whence it may be passed through the pipe 70 and valve 72 to electrolytic precipitation tanks, or to whatever apparatus is to be used for getting out the copper; or it may pass to other purification processes such as the removal of the residual of iron from aluminum sulphate solutions by means of ferro-cyanides; or the solution may be returned to the leaching tanks. Also if the tank F has been used as first described for removing copper, the solution remaining therein may be similarly discharged through the heat interchanger for such further use as may be desired.

A third method of removing the copper may be under heat and pressure, but not in the same tank F which was used for precipitating the iron. The tanks G, H and I may be used for this operation. The actual precipitation of the copper is effected in the tank I. The purified solution from the tank F is forced into the tank G by opening the valve 19 in the pressure pipe 20 and then the valve 29 leading to the tank F, the liquor passing through the pipe 30 and open valve 31 into the tank G. For the next operation, pressure is admitted to the tank G by opening the valve 34 in the pressure line and the liquor passes through the pipe 37 and valves 38 and 39 to the tank H. Later a similar transfer is effected by opening the valve 39$^a$ to admit pressure to the tank H and to cause the liquor to flow through the open valves 40, 41 and 41$^a$ and the pipe 42 into the tank I.

The removal of copper in the tank I is by the same method as previously described in the tank F, the reagent being introduced under pressure through the pipe 46 and open valve 47. With sulphur dioxide the pressure in the tank I stands at about 150 pounds. But the temperature will be only about 160 degrees centigrade, whereas 185 degrees centigrade is the temperature which corresponds to a water vapor pressure of 150 pounds. This pressure is reached because of the added partial pressure of the sulphur dioxide injected. If formic acid is used as the precipitant, the pressure in tank I will more nearly correspond to the temperature, or about 160 degrees centigrade and 75 pounds.

The precipitated copper is removed through the discharge pipe by opening the valve 51. The tank I is then equalized first with the tank H through the pipe 42, and then with the tank G through the pipe 37, substantially as described for the iron precipitation system of tanks D, E, F. A part of the pressure in the tank G may be relieved after the first equalization with I through the pipe 35 and open valve 36 leading into the receiver L, the tank G being then equalized again with the tank I. Finally, the solution in the tank, being at some temperature and pressure above boiling, conditions depending upon the copper precipitant used, is discharged through the valve 52 and pipe 53 to the heat interchanger C, where its heat is usefully employed to bring the advancing solution into tank D nearly to the boiling point. After the tank I is discharged, the solution in the remaining tanks is advanced. The solution in H passes into tank I for precipitation of a portion of its copper content, the solution in G passes into H, that in F passes into G, that in E passes into F for the precipitation of a portion of its iron, alumina and other impurities, and that in D passes into E. Also the solution in B passes through the opened valve 9, pipe 10 and interchanger C into the tank D, absorbing heat from the solution which is passing through the interchanger. A fresh charge of solution is passed from the short tower A into the tank B. Tank B ought to have about twice the capacity of the other tanks to allow for storage and to adjust discrepancies in volumes throughout the system.

The tanks A, B, J and D and their connections constitute the oxidation system and are used to establish the fixed nitrogen cycle. The solution entering through the pipe 1 passes through the tower A into the tank B where it is treated through the pipe 5 and perforated distributor 7 with a mixture of nitric oxide and air, or oxygen, or NO+ O+N. Approximately one-half the iron should be oxidized. The nitric oxide which catalytically effected this oxidation should remain in solution with the excess of ferrous sulphate. The inactive portion of the air, the nitrogen, passes out through the vent 2. Now when the solution in B is advanced into D through the heat interchanger and brought nearly to the boiling point, fresh air or oxygen is introduced through the valve 77, tank J, valve 12 and perforated pipe 13 to decompose the compound of nitric oxide (NO) with ferrous sulphate and to regenerate nitrogen dioxide (NO$_2$) which passes back through pipe 5 and perforated distributor 7 into the liquid in the tank B. The air or oxygen may be ozonized to a desired extent in passing through J into D. But it is not desirable to oxidize all the iron in D before the nitric oxide has been removed from the solution therein by the air or oxygen. Under such conditions some nitrogen dioxide (NO$_2$) might be formed and, in turn, nitrous and nitric acids. It is advisable to so regulate the proportion of air, oxygen or ozone that the solution will be cleared of nitric oxide (NO) before all the iron is oxidized, leaving a small portion of ferrous iron in the solution as a protection against corrosion by nitrogen acids in the tank system.

By the use of a large excess of nitric oxide (NO) with air, or oxygen, the oxidation can be nearly completed without the use of ozone or oxygen. But this means a comparatively large loss of fixed nitrogen. The use of ozone or oxygen in the nitrogen cycle is very effective and involves practically no loss of nitric oxide with a low consumption of ozone or oxygen.

In the present application this oxidation system is claimed only in connection with the purifying operations by heat and pressure described. A second application No. 598,479 filed November 2, 1922 covers the oxidation system in other connections and also in greater detail.

Where the residual solution from the tank F or I is to be passed back to the leaching tanks, it is first passed through the short tower P and there treated with nitric oxide and air or oxygen or ozone. The nitric oxide and air are brought through a pipe 75 to the pipe 74 entering the lower part of the tower, and escape by pipe 73 passing out of the top of the tower. A pipe 14 is shown passing from the tank J to the pipe 74 through which some ozone or oxygen may also be introduced. In this operation it is beneficial that small quantities of nitrogen acids be formed. They aid in the leaching action of the solution on the sulphide particles of the ore charge. The reoxidation of solutions at this point is also desirable to fix any free sulphur dioxide in the solution, converting it into useful sulphuric acid and thus increasing the proportion of sulphur dioxide fixed in the process as compared with the total amount supplied.

The conditions of temperature and pressure imposed upon the solution have been described for a particular case. They may be considerably varied from the conditions described, even for the same solution, with results which vary correspondingly but still make a practicable process. Such conditions may also be varied so as to separate other elements than those described. For example, the process might be applied to the purification of sulphate solutions of copper, zinc, nickel and aluminum, and not of copper only.

For this purpose we would first precipitate iron, aluminum and arsenic and remove the precipitate, leaving a solution of copper, zinc and nickel. To recover the aluminum we would form a second solution of the first precipitate and from this second solution we would precipitate the iron and arsenic. I have found it comparatively easy to precipitate the iron, aluminum and arsenic at one operation under the conditions referred to in detail above.

For the second solution, the precipitation of the iron and arsenic from the solution containing these elements together with aluminum, the temperature, length of time and other conditions are readily determined by experiment following the rules stated hereinafter. By various and successive treatments the several impurities in the first solution may be isolated and become valuable by-products. Thus aluminum may be largely separated from iron, and both removed from a copper solution by precipitation with heat and pressure before and after oxidation respectively. That is, the aluminum may be precipitated first from the solution by the described treatment before oxidizing the iron; after which the precipitate of aluminum would be blown out and the solution oxidized and treated again at high temperature to produce a precipitate mainly of iron. For example, the iron may be separated from the aluminum; iron, aluminum and arsenic may be separated from zinc; aluminum, iron and arsenic from copper, and so forth. The procedure would be the same in separating iron, aluminum and arsenic from zinc and in separating these impurities from copper. A great variety of conditions of the solution, such as different acidities, different alkali or alkaline earth salt contents, may be employed together with variations in the temperature and pressure to secure the desired separations.

Among the by-products referred to above, the following two may be mentioned.

Generally, the precipitates formed from our copper leach liquors have been a brilliant yellow in color, and, when dried, are extremely fine grained, being impalpable powders. Such material might serve as a valuable paint pigment, and could be made from what are known as "waste pickling liquors" from steel and plating works. The material precipitated, and which gave the brilliant yellow pigment, was principally a basic sulphate of iron. The presence of much copper gives greenish shades. Ignition of the material gives fine grained pigment for Venetian or Indian reds.

The same fine grained precipitate, being essentially basic iron sulphate, has been ignited to drive off $SO_2$ and $SO_3$ leaving fine grained oxides of iron. When this ignited material is mixed with coal dust, and heated in a closed muffle, at a temperature below the melting point of metallic iron, the fine particles of iron oxide are reduced to the metal, but remain finely divided, forming what is known as "sponge iron". The production of sponge iron from our precepitate in this way, seems to be effected much more readily than by the ordinary procedure of reducing hematite (ordinary iron ore). The sponge iron is useful as a precipitant of metallic copper from discard solutions.

It is important to note that a higher alkali salt content generally aids the precipitation of other impurities, and that the alkali salt is itself precipitated together with the iron, aluminum and so forth, from which precipitate it may be subsequently largely recovered by filtering and washing the precipitate with neutral, acid or alkaline washes, without notable re-solution of the other portion of the precipitate.

Precipitates formed primarily by reason of the above imposed conditions may, by the attraction of nuclei, occlude and carry down other constituents, for example arsenic and silica iron. Selenium and tellurium would also probably be similarly occluded and precipitated. And besides the separation of one metal from another in the solution, the process can be used for precipitating a metal like copper from a pure or previously purified solution, as described above in connection with the tank I. The invention is apparently of particular importance in treating sulphate solutions of metals. It may be applied also to other solutions, and particularly to sulphate solutions containing other dissolved acid ions besides the sulphate ion.

The preliminary oxidation of the solution is not essential to the precipitation process, though of great value in the particular case illustrated. The cyclic oxidation process permits conservation of valuable gases. It may be performed with various agents, alone or in combination, particularly with nitric oxide, nitrogen dioxide, air, oxygen, ozonized air or ozone, or gaseous or alkali nitrates for example. Any excess of oxidizing agent used may be removed by the application of heat.

A high proportion of oxidation may be effected by the use of oxygen alone. Thus oxygen may be injected into solutions at about 75 degrees centigrade, the injection taking place through a porous medium, such as alundum, so as to give indefinitely fine division of the entering gas. The escaping gas, not consumed in the oxidation process, can be re-injected through the porous medium. Again, oxygen may be directly injected into the iron precipitator F when the solution is ready for precipitation. Thus assuming the tank F at 100 pounds gauge, and 170 degree centigrade, oxygen may be directly injected at 150 pounds, or 50 pounds pressure above that of the water vapor at 170 degrees. In this case, the mode of injection is not important, since the reaction takes place essentially at the surface of the liquid by molecular exchange between the liquid and gaseous phases and there is not a continued passage of the oxygen by bubbling through the liquid as explained for the reaction conducted at 75 degrees. A convenient way to inject the oxygen at high pressure would be to inject it with the superheated steam that is used to head the liquor.

The heat regenerative system is also unnecessary in theory but is of practical importance for economy's sake.

The particular applications of my process which appear to have the most value are the following—

1. Purification of copper leaching liquors;
2. Purification of zinc leaching liquors;
3. Purification of aluminum leaching liquors;
4. Separation of iron and arsenic from copper;
5. Separation of iron and arsenic from zinc;
6. Separation of iron and arsenic from aluminum;
7. Separation of iron, aluminum and arsenic from copper;
8. Separation of iron, aluminum and arsenic from zinc;
9. Purification of alkalic or alkaline earth salt liquors.

In the several alternative operations referred to above the operating conditions may be considerably varied. There seem to be about six fundamental items to consider when a precipitation of any of the elements dissolved in aqueous acid leach liquor is attempted. Each one of these items is variable at the will of the operator and the variation of any one item may make considerable difference in the quality and quantity of the precipitate formed. Then a number of combinations of the individual variables make the different conditions which produce the various results mentioned. The determination of such combinations is within the skill of the persons expert in this art, and the best conditions can be readily determined by tests. The variable items referred to are:—

Temperature attained in the solution.
Time held at temperature.
Agitation of solution during treatment.
State of oxidation of the iron, arsenic, etc.
Amount of free acid present, and
Amount of sodium (or alkali salt) present.

These variables must be used according to the following rules to produce a precipitate.

(a) The higher the temperature, the greater the amount of any element precipitated. I have used from 150° to 180° C. in the purification of copper leach liquors.

(b) The longer the time, the greater the precipitation. I have used from 10 to 60 minutes at temperature in the work above stated.

(c) Agitation when the solution is at temperature seems to increase precipitation.

(d) Iron and arsenic should be in their higher states of oxidation to precipitate. That is, the iron, as ferric iron and the arsenic as arsenic arsenic may be made to precipitate. This is especially true of iron. Ferrous iron remains in the solution. We cannot be quite so certain about arsenous arsenic since, generally, the mass of precipitate is so great that it includes some arsenous arsenic. But we base our calculations upon precipitation of ferric iron and arsenic arsenic only.

(e) High free acid generally lessens the amount of precipitation. It has the most effect on lessening precipitation of aluminum. Thus, a solution containing all iron as ferric iron and, say, 20 gms. of free $H_2SO_4$ per liter at the start might be made to precipitate most of the iron and leave the aluminum in solution. This effect would be aided by the rapid increase in acid content, due to regeneration, as the iron is precipitated. Thus, the solution after treatment might carry 50 gms. of free $H_2SO_4$ per liter, whereas it had only 20 gms. at the start. This high acid content, assuming a very low content of sodium or other alkali salt at the same time, would probably prevent an appreciable precipitation of aluminum. Thus, we might considerably purify an aluminum leaching liquor by precipitation of the major portion of the iron.

A better way, however, would be to reverse the above procedure. By increasing the alkali salt content (for example $Na_2SO_4$), neutralizing some of the free acid and reducing the iron to the ferrous state with, say, $SO_2$, we might precipitate nearly pure basic aluminum sulphate.

This would be the operation referred to above as "6. separation of iron and arsenic from aluminum."

(f) As noted above, an increase in the sodium or alkali salt content of the solution improves the precipitation, particularly of aluminum.

The invention does not contemplate, in the term purification, the elimination of copper or of zinc from a solution containing both these metals. These are not considered, for the purposes of this invention, as impurities. With solutions of these two metals separately substantially the same operations would be involved in getting out the other metals which would constitute the impurities. When zinc and copper are together in the same solution, their separation is not to be effected by this process. Other methods would have to be used for separating them after removing the impurities from the solution. For example, they could be separated by the known method of disposition of the copper as metal or metallic zinc, leaving only zinc in solution. Or the separation of the copper might be effected by this same way, and the remaining solution of zinc be purified by the treatment previously described previous to the securing of the zinc by electrolysis or other methods. Though, as has been said, the present invention does not contemplate precipitating either copper or zinc as an impurity; yet they may be included in slight amount with the basic sulphate or aluminum. This seems to be unavoidable, but such conditions should be selected that this inclusion of copper may be as small as possible. If the precipitate carries, say copper, the conditions should be arranged so as to minimize the precipitation of copper, or the copper in the precipitate should be recovered as previously described, by mixing with liquor or injecting $SO_2$ at about 155°. During this operation, the acid builds up to about 100 gms. per liter of $H_2SO_4$ and thus dissolves the basic aluminum sulphate.

As an example of the application referred to above as "9. purification of alkalic or alkaline earth salt liquors," we may take the case of a solution obtained by a leaching operation on feldspathic material to recover potassium. As has been explained, the presence of a high alkali salt content, for example $Na_2SO_4$, in a solution greatly improves the precipitation of iron and aluminum as basic sulphate. This is especially true of aluminum. Some of the sodium or other alkali appears to be carried down with the precipitate. In the potassium solution referred to, there would be also some iron and aluminum. If such a solution were treated by this invention for purification, almost all the iron and aluminum might be precipitated because of the high content of the alkali, potassium. Some of the potassium would be carried down also. But from such a solution this alkali removed would be only a small part of the total present and thus the treatment would constitute a purification of the leach liquor by precipitation of the iron and aluminum, even though such treatment also removed a part of the alkali which it is desired to retain in the solution.

The formic acid described as an alternative precipitant for copper may be used either alone or in conjunction with the sulphur dioxide. Also formic acid may be applied at any point in the cycle of operations. It may be applied, for example, in the heat regenerative system.

The best results are obtained in the copper extraction process described by preliminary oxidation of iron in the solution. I have found, however, that certain quantities of ferrous iron can be precipitated when present in certain ratios and under certain pressures and temperatures.

As an example of the actual practice of my process in obtaining copper from the ore, I cite the following,—the leaching process took up with the 22 pounds of copper 8.3 pounds of iron and 1.9 pounds of alumina ($Al_2O_3$). The solution contained per liter the following quantities of impurities: 12.5 grams of iron; 2.9 grams of alumina; 2.28 grams of arsenic oxide ($As_2O_3$). The ferric iron was 93.8% of the total iron, or 11.7 grams per liter of the solution. By my process of applying heat and pressure I succeeded in precipitating 84.2% of the ferric iron; 33.3% of the alumina; 80% of the oxide of arsenic. From another copper solution containing 21.4 grams of ferric iron per liter, 4.9 grams of alumina and 2.9 grams of arsenic oxide, I got an elimination of 18.1 grams of ferric iron per liter; 1.63 grams of alumina; 1.92 grams of arsenic oxide.

I have referred above to the use of formic acid as a substitute for sulphur dioxide and have claimed the complete process herein so broadly as to include the use of either of these reducing agents or any other known or suitable re-agent or mixture of re-agents in this connection. I have discovered also that formic acid may be used in other processes as a reducing agent to precipitate metallic copper, and have claimed such use separately in another application for patent.

In the preparation of industrial solutions one or more products are sought for as the essential end product of the operation, and other elements which are simultaneously taken into the solution are considered impurities for the purposes of the present application in so far as they may interfere by their accumulation with the treatment of the solution to recover the essential end product. Thus, in leaching for copper we would consider iron and aluminum to be impurities; while in leaching clays for aluminum we would consider iron an impurity from which it would be desirable to separate the aluminum. The impurities referred to in this application may be called in a general sense metallic impurities because the more important separations involve the precipitation of a salt of a metal or a combination of metals, such for example as basic ferric and aluminum sulphates. If these metallic salts were not primarily formed, then we would not remove other impurities such as sodium, arsenic and phosphorus; and it should be noted that arsenic and phosphorus are thrown down together with the main mass of precipitate as arsenate and phosphate of some one of the metals simultaneously precipitated, and they would not have been thrown out of solution at all if the first metallic salt precipitate had not been formed and thus furnished a skeleton for their inclusion. When we speak therefore of metallic solutions and metallic impurities we must be understood as including all solutions which are mainly of metals, though they may include known metals and also so-called metalloids; for example the solutions described of iron and aluminum containing arsenic and phosphorus.

In referring to ores of copper it is to be understood that we include not only the raw ores but other similar copper bearing material such as the roasted concentrates referred to, cement copper and other plant products. The process may be applied to all of these. Various other methods of heating the solutions may be used instead of the direct injection of steam specifically referred to above.

Though I have described with particularity of detail certain processes within my invention, yet it is not to be understood therefrom that the invention is restricted to the particular processes disclosed. Various modifications in the steps and in the order thereof may be made and various of the steps described may be utilized alone or in other connections by those skilled in the art without departure from the invention as defined in the following claims.

What I claim is:

1. In the removal of impurities from acid solutions the method which comprises subjecting the solutions to heat and pressure sufficient to produce a precipitate containing the impurities.

2. In the removal of metallic impurities from acid solutions, the method which comprises subjecting the solutions to heat and pressure sufficient to produce a precipitate containing the metals to be removed.

3. The method of treating an acid solution of a metal containing impurities which consists in subjecting the solution to heat and pressure sufficient to produce a precipitate of such impurities and treating the remaining solution with a re-agent to precipitate the metal.

4. The method of treating a sulphate solution of copper containing impurities in solution, which consists in subjecting the solution to heat and pressure sufficient to produce a precipitation of such impurities, and removing the precipitate.

5. The method of treating a sulphate solution of copper containing metallic impurities in solution, which consists in oxidizing the said metallic impurities and subjecting the solution to heat and pressure sufficient to produce a precipitation of the salts of such metallic impurities and removing the precipitate.

6. The method of treating a sulphate solution of copper containing impurities in solution, which consists in subjecting the solution to heat and pressure sufficient to produce a precipitation of such impurities, and removing the precipitate and then removing the copper from the remaining solution.

7. The method of treating sulphate solution of copper containing impurities in solution, which consists in subjecting the solution to heat and pressure sufficient to produce a precipitation of such impurities, and removing the precipitate and then removing the copper from the remaining solution by treatment with sulphur dioxide.

8. The method of recovering copper from its ore which consists in first subjecting the ore to a solvent of the copper and metallic impurities and removing the copper and the metallic impurities separately from said solution, the metallic impurities being removed by heat and pressure sufficient to produce precipitation thereof and regeneration of free acid.

9. The method of recovering copper from its ore which consists in first subjecting the ore to a solvent of the copper and metallic impurities and removing the copper and the metallic impurities separately from said solution, the metallic impurities being removed by heat and pressure sufficient to produce precipitation thereof and regeneration of free acid and returning the liquor to the copper ore for re-use.

10. The method of treating sulphate copper solutions to remove metallic impurities therefrom which consists in oxidizing such solutions and then subjecting them to heat and pressure sufficient to precipitate the impurities.

11. The method of treating a solution containing iron and arsenic which consists in subjecting the same to heat and pressure sufficient to precipitate iron and arsenic therefrom.

12. The method of treating a solution containing iron, arsenic and aluminum which consists in subjecting it to heat and pressure sufficient to produce a precipitate containing them.

13. The method of recovering copper from a solution containing iron and arsenic as impurities which consists in first precipitating such impurities by means of heat and pressure, and removing the copper in a separate operation.

14. The method of recovering copper from a solution containing iron and arsenic as impurities which consists in first precipitating such impurities by means of heat and pressure and precipitating the copper by means of sulphur dioxide.

15. The method of recovering copper from its ore which consists in subjecting the latter to the action of dilute free sulphuric acid to form a solution of copper and impurities from the ore, oxidizing the resulting solution and precipitating the impurities by means of heat and pressure.

16. The method of recovering copper from its ore which consists in subjecting the latter to the action of dilute free sulphuric acid to form a solution of copper and impurities from the ore, oxidizing the resulting solution and precipitating the impurities by means of heat and pressure and returning the mother liquor to the ore for further use.

17. In the removal of impurities from solutions the method which comprises subjecting the solutions to heat and pressure sufficient to produce a precipitate containing the impurities, withdrawing the hot purified solution and transferring the heat thereof to a body of unpurified solution to preheat the latter before treatment thereof.

18. In the removal of impurities from acid solutions the method which comprises subjecting the solutions to heat and pressure sufficient to produce a precipitate containing the impurities, removing the impurities and redissolving them in the presence of reducing agents and high acid and thus separating from the impurities a portion of the principal metal which was carried down with the precipitate in the first stage.

19. The method of treating sulphate copper solutions to remove metallic impurities therefrom which consists in subjecting them to heat and pressure sufficient to precipitate the impurities.

20. In the removal of impurities from acid solutions, the method which comprises oxidizing the solutions and then subjecting them to heat and pressure sufficient to produce a precipitate containing the impurities.

21. In the removal of impurities from acid solutions, the method which comprises oxidizing the solutions with a catalyst and subjecting them to heat and pressure sufficient to produce a precipitate containing the impurities.

22. In the removal of impurities from acid solutions, the method which comprises oxidizing the solutions with a catalyst consisting of an oxide of nitrogen and subjecting the solutions to heat and pressure sufficient to produce a precipitate containing the impurities.

23. In the removal of impurities from acid solutions the method which comprises subjecting the solutions to a temperature of about 170 degrees centigrade and a pressure of about 100 pounds per square inch and thus producing a precipitate containing the impurities.

In witness whereof, I have hereunto signed my name.

LOUIS F. CLARK.